3,446,453
FISHING REEL WITH COMBINED LINE TAKE-UP AND DRAG
Leo C. Pachner, Momence, Ill., assignor to Shoe Form Co., Inc., Auburn, N.Y., a corporation of New York
Filed Feb. 8, 1967, Ser. No. 614,678
Int. Cl. A01k 89/02
U.S. Cl. 242—84.5                     1 Claim

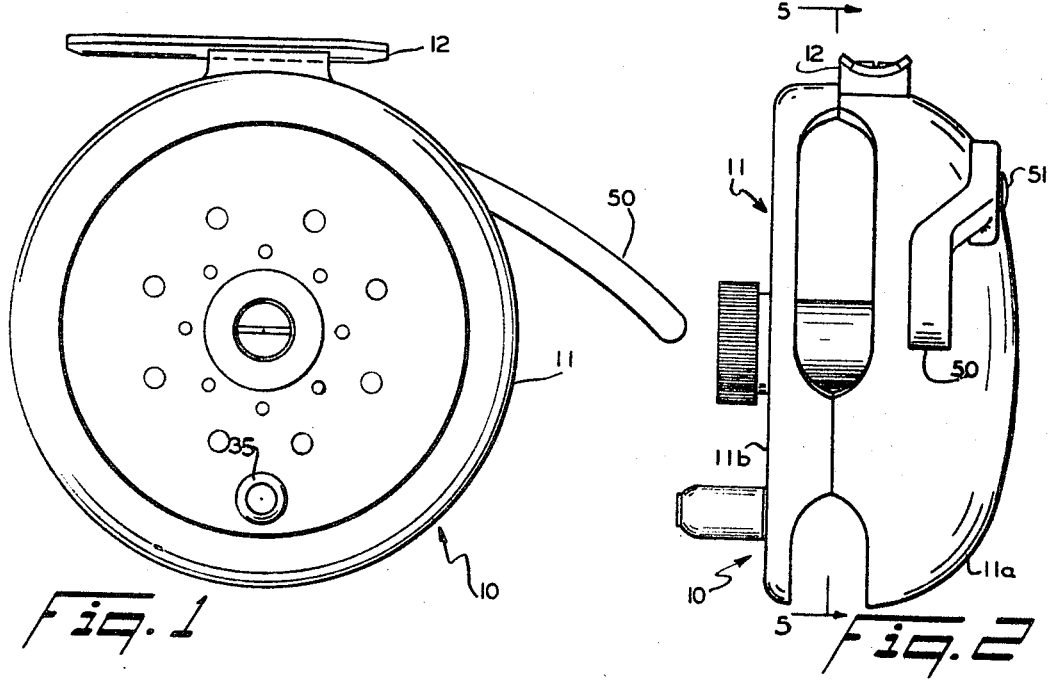
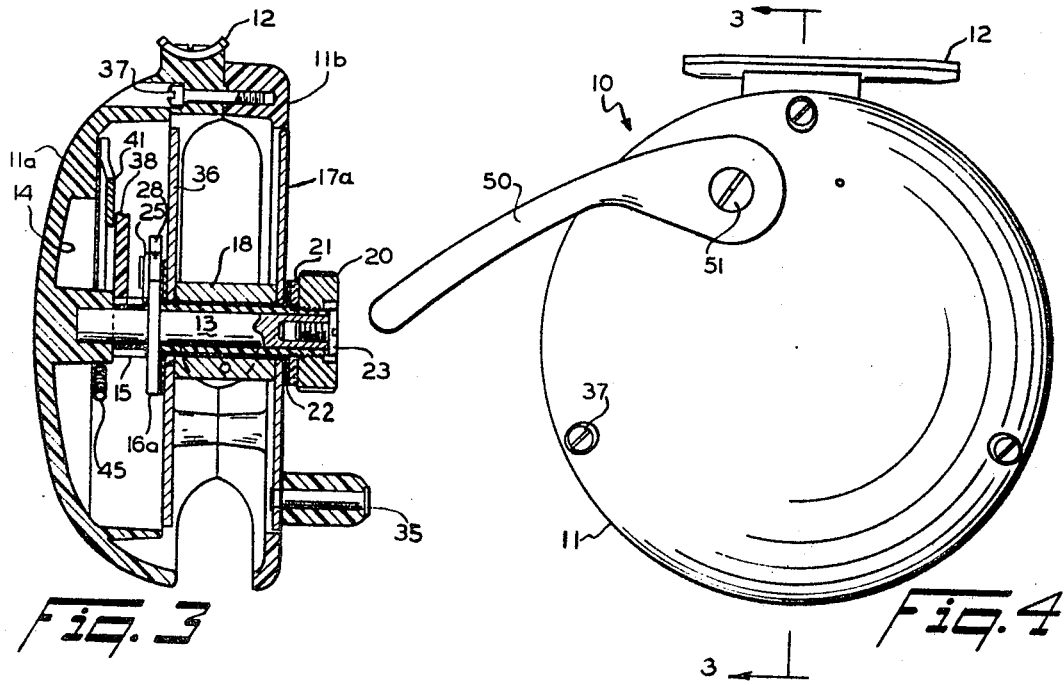

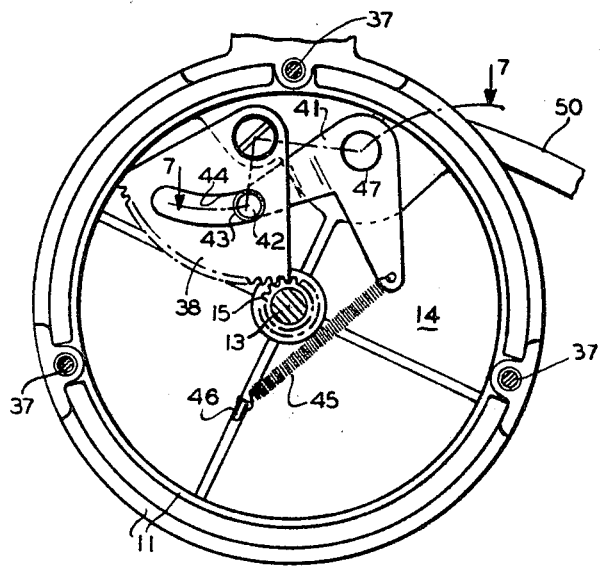
Fig. 5
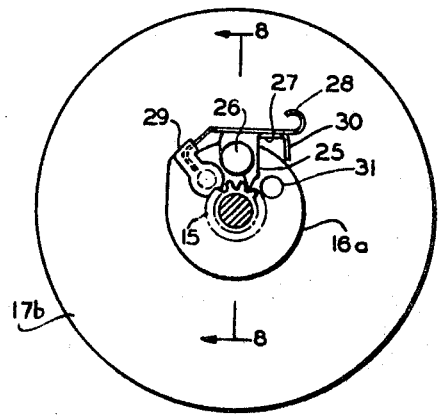
Fig. 6
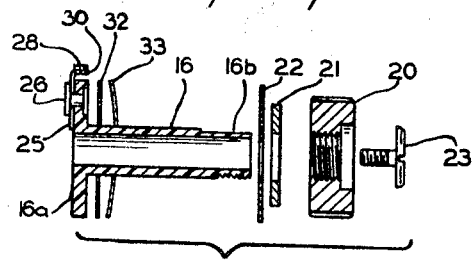
Fig. 8
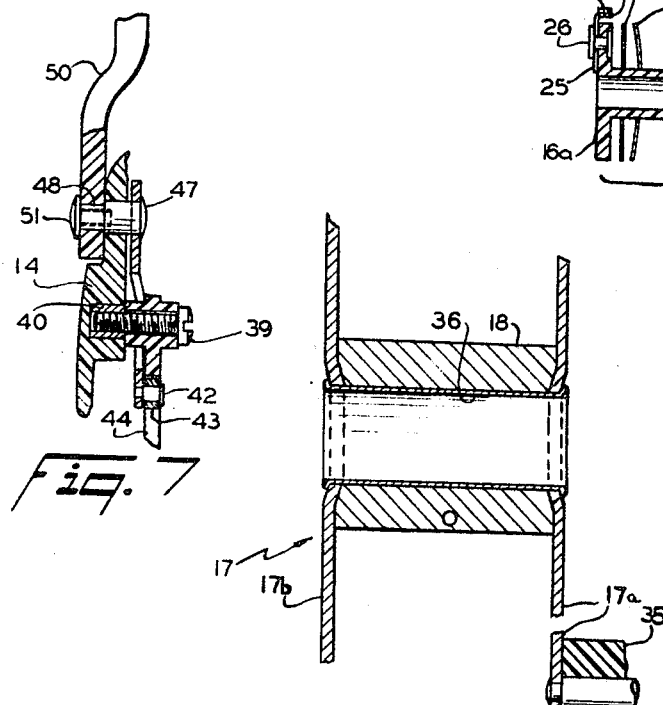
Fig. 7
Fig. 9
INVENTOR.
LEO C. PACHNER United States Patent Office 3,446,453
Patented May 27, 1969

ABSTRACT OF THE DISCLOSURE

The reel spool is rotatably mounted on a tubular member rotatably disposed on a shaft fixed to the reel casing. Trigger operated means, including a gear segment pivotally mounted on the casing, drives a gear rotating on the shaft. An enlarged drum on one end of the tubular member carries a pawl in engagement with the gear for one-directional rotation of the drum. A nut on the other end of the tubular member squeezes the spool axially between drum and nut providing a friction brake connection between drum and spool.

Background of the invention

This invention relates to fishing reels and particularly to those having trigger operated means for taking up the slack in the line.

Reels with trigger-operated line take-up mechanisms heretofore have had a pawl connection between the drive gear of the take-up mechanism and the line spool which prevented the provision of drag or brake means applied at the axial ends of the spindle of the spool at a point where the spool is strongest. As a result any drag built into these reels had to be applied separately to more fragile parts of the reel, such as to the take-up mechanism or to the circular edges of the spool ends.

Summary of the invention

The invention contemplates mounting the spool on a tubular member which in turn is mounted on the reel shaft. An enlarged portion, or drum, at the inner end of the tubular member carries the take-up mechanism pawl and a nut at the outer end of the tubular member provides adjustable means for squeezing the spool axially of its spindle portion to provide a frictional connection between tubular member and spool which acts as a drag when the spool is turned in its unwinding direction.

The principal object of the invention accordingly, is to provide a reel with brake means between the line take-up operating mechanism and the spool which brake is applied axially of the spindle portion of the spool.

Another important object is to provide manually adjustable brake means acting axially on the spool for providing drag means which is independent of the line take-up mechanism.

A further object is to provide a reel with combined take-up and drag means which is simple in design, reliable in operation, economical to make, and has a minimum number of parts which are light in weight and easy to assemble.

Other objects and advantages will become apparent from the following description and the appended drawings, in which:

Brief description of the drawings

FIGURE 1 is a front elevational view of a reel according to the invention;
FIGURE 2 is a side elevational view thereof;
FIGURE 3 is a sectional view on the line 3—3 of FIGURE 4;
FIGURE 4 is a back elevational view of the reel of FIGURE 1;
FIGURE 5 is a sectional view on the line 5—5 of FIGURE 2, the spool and tubular member being removed for clarity;
FIGURE 6 is a back elevational view, partly in section, of the spool, tubular member and associated parts;
FIGURE 7 is a fragmentary sectional view on the line 7—7 of FIGURE 5;
FIGURE 8 is an exploded sectional view of the tubular member and associated parts on the line 8—8 of FIGURE 6; and
FIGURE 9 is a fragmentary enlarged sectional view of the spool.

Description of the preferred embodiment

In the drawings the reel 10 comprises a casing 11, to which the usual mounting plate 12 is secured, and a stub shaft 13 secured in and projecting from the end wall 14 of the casing. A gear 15 and tubular member 16 are rotatably mounted on shaft 13, as shown, and a spool 17 having a hollow spindle portion 18, is rotatably mounted on the tubular member 16. Casing 11 and tubular member 16 may advantageously be made of molded plastic.

The tubular member, best seen in FIGURE 8, has an enlarged circular flange or drum portion 16a at its end adjacent gear 15 and its other end is threaded for connection with the brake nut 20. A washer 21 and friction washer 22 are mounted on the threaded end of the tubular member 16 between nut 20 and spool 17. Washer 21 has a flat portion keying it with a flatted portion 16b of the threaded end of tubular member 16. The front or free end of stub shaft 13 is provided with a cap screw 23, as shown in FIGURE 3, nut 20 being counterbored at its front side therefore.

The drum 16a of tubular member 16 is provided with a single tooth member or pawl 25 pivotally mounted on the face of the drum adjacent gear 15 by a headed stud 26 so as to mesh with the gear 15 when the gear is driven in the winding-in direction of spool 17. The peripheral end of pawl 25 is bent over to provide a flat portion 27, and a leaf spring 28, having one end embedded in a suitable peripheral boss 29 on drum 16a, contacts this flat portion to yieldably hold pawl 25 in gear engaging position. The end 30 of flat portion 27 may be bent down, as shown to form a stop for the pawl in one direction and a boss 31 on drum 16a may be provided to form a stop in the other direction.

A friction washer 32 and a bent friction washer 33 are mounted on tubular member 16 between drum 16a and spool 17.

As best seen in FIGURES 3 and 9 the spool 17 comprises sheet metal end plates 17a and 17b joined by a hollow metal spindle portion 18, front plate 17a being provided with the usual projection or crank handle 35. For joining the end plates to the spindle, the latter is provided interiorly with a hollow clincher tube 36 whose ends may be bent over to clinch the centers of the plates to appropriate shoulders at the ends of the spindle. To provide a flat surface for the friction washers 22 and 33 to bear against, the end plates 17a and 17b are dished inward of the spool at their centers, as shown in FIGURE 9.

Means similar to those disclosed in Patent 2,591,338 are provided on end wall 14 of the casing 11, which may be made in two parts 11a and 11b secured together by screws 37 as seen in FIGURES 3 and 5. A toothed quadrant or gear segment 38 of plastic, having teeth in mesh with gear 15 in all positions, is pivotally secured to end wall 14 by the headed screw 39 (FIGURE 7) threaded into a metal insert 40 molded in end wall 14.

A metal bell crank 41 is also pivotally secured to end wall 14 and has one arm bearing a headed stud 42 on which is mounted a roller 43 engaged in an arcuate slot 44 in the segment 38. The end of the other arm of crank 41 is engaged with one end of a spring 45 whose other end is engaged in a perforate boss 46 on end wall 14.

The pivot point of crank 41 bears a short projecting shaft 47 secured to it by welding, or otherwise, which projects through an appropriate hole in end wall 14 and has a square portion 48 protruding from casing 11.

An operating lever or trigger arm 50 is secured on the squared end 48 of shaft 47 by a cap screw 51 screwed into the shaft. The trigger arm projects from the case 11 in such a position with relation to plate 12 that it is operable by the last two fingers of a fisherman's hand grasping a pole to which the reel has been secured.

When trigger 50 is operated upward, as viewed in FIGURE 4, crank 41 is operated counterclockwise, as viewed in FIGURE 5, against the bias of spring 45. Roller 43, carried on the arm of crank 41 moves downward swinging gear segment 38 to the right in FIGURE 5 until the roller reaches the end of slot 44, the teeth of the segment being still engaged with the teeth of gear 15.

As gear 15 rotates, its teeth engage the tooth of pawl 25 rotating the tubular member counterclockwise, as viewed in FIGURE 6. This is the line-winding direction for spool 17. When roller 43 reaches the end of slot 44, trigger 50 can be released and spring 45 returns crank 41 and segment 38 to their starting positions.

The tubular member 16, which carries spool 17, however, can continue in its line-winding direction because the tooth of pawl 25 can swing to the right, as viewed in FIGURE 6, against the bias of spring 28, the pawl riding over the teeth of gear 15. The tubular member 16 is turned by the momentum of spool 17 since the bent washer 33 is alway frictionally engaged with friction washer 32 and biases the spool against friction washer 22, friction washer 32 being in engagement with the adjacent annular face of drum 16a and friction washer 22 being engaged against washer 21 which is keyed to the tubular member 16.

When the brake nut 20 is tightened on tubular member 16, as shown in FIGURE 3, the frictional engagement between spool 17 and tubular member 16 is increased. Nut 20 bears against washers 21 and 22 forcing spool 17 to the left against bent washer 33, as viewed in FIGURE 8. This biasing action of nut 20 flattens washer 33 against friction washer 32 which is forced against the adjacent face of drum 16a.

The frictional engagement between tubular member 16 and spool 17 works in both directions and provides a brake for the reel when spool 17 is turned in its line-unwinding direction. When the spool is turned in this direction the tubular member is prevented from turning in the same direction by the engagement of pawl 25 with the teeth of gear 15 regardless of whether or not gear 15 is being rotated in its uni-directional path.

It will be apparent that both trigger-operated line-winding means and brake means, to slow the line-unwinding rotation of the spool, have been provided, the one operated by the manual operation of trigger 50 and the other controlled by the easily accessible nut 20 at the outer surface of the spool. Furthermore due to the uni-directional connection between gear 15 and tubular member 16, the line winding mechanism is freely operable regardless of the setting of the brake mechanism between tubular member 16 and spool 17.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claim.

What is claimed is:

1. A fishing reel comprising a casing having an end wall; a stub shaft mounted on said wall; a tubular shaft rotatably mounted on the stub shaft; a spool rotatively disposed on the tubular shaft; a gear rotatably mounted on the stub shaft and disposed between the wall and the tubular shaft; a driver and a gear segment each pivoted to the casing, the driver being manually operable from outside the casing and having a pin and slot connection inside the casing with the segment for driving the segment, the segment drivingly engaging the teeth of the gear in all operative positions; the tubular shaft having an enlarged drum at its end adjacent the gear and having its other end threaded; a spring positioned pawl carried on the drum, the pawl engaging the teeth of the gear to provide a one way drive for the tubular shaft when the gear is driven in winding-in direction and enabling the tubular shaft to continue turning in the winding-in direction after the gear ceases rotation; friction means including a bent spring washer on the tubular shaft between the drum and the spool; a nut on the threaded end of the tubular shaft for biasing the spool axially toward the drum to provide a friction brake when the spool is turned in unwinding direction; at least one friction washer on the tubular shaft between the nut and the spool; and a cap screw at the end of the stub shaft preventing removal of the spool from the casing.

References Cited

UNITED STATES PATENTS

| | | | |
|---|---|---|---|
| 2,428,908 | 10/1947 | Cooper et al. | 242—84.51 |
| 2,471,723 | 5/1949 | Cannon. | |
| 2,591,338 | 4/1952 | Cooper | 242—84.51 |
| 2,593,700 | 4/1952 | Rosner | 242—84.45 |

BILLY S. TAYLOR, *Primary Examiner.*